United States Patent
Mirzeabasov et al.

(10) Patent No.: US 9,738,369 B2
(45) Date of Patent: Aug. 22, 2017

(54) MULTIPURPOSE AIRSHIP AND SET OF AIRSHIPS

(71) Applicants: ANTER LLC, Saint-Petersburg (RU); RUFIUS Oy, Lappeenranta (FI)

(72) Inventors: Timur A. Mirzeabasov, St.Petersburg (RU); Lidia N. Shkolina, St.Petersburg (RU); Svetlana T. Romanova, St.Petersburg (RU); Dimitrii O. Belov, St.Petersburg (RU); Valery M. Volynkin, St.Petersburg (RU); Vadim Y. Golovan, St.Petersburg (RU); Fail N. Suleymanov, Ufa (RU); Igor Vodyanoy, Redondo Beach, CA (US)

(73) Assignees: ANTER LLC, Saint-Petersburg (RU); RUFIUS OY, Lappeenranta (FI)

( * ) Notice: Subject to any disclaimer, the term of this patent is extended or adjusted under 35 U.S.C. 154(b) by 0 days.

(21) Appl. No.: 15/322,933

(22) PCT Filed: Jun. 29, 2015

(86) PCT No.: PCT/RU2015/000401
§ 371 (c)(1),
(2) Date: Dec. 29, 2016

(87) PCT Pub. No.: WO2016/003324
PCT Pub. Date: Jan. 7, 2016

(65) Prior Publication Data
US 2017/0129580 A1    May 11, 2017

(30) Foreign Application Priority Data
Jul. 1, 2014  (FI) ..................... 20145641

(51) Int. Cl.
*B64B 1/66* (2006.01)
*B64B 1/22* (2006.01)
*B64D 27/24* (2006.01)

(52) U.S. Cl.
CPC ............... *B64B 1/66* (2013.01); *B64B 1/22* (2013.01); *B64D 27/24* (2013.01)

(58) Field of Classification Search
CPC ............. B64B 1/66; B64B 1/22; B64D 27/24
(Continued)

(56) References Cited

U.S. PATENT DOCUMENTS

2011/0240794 A1   10/2011  Hariri

FOREIGN PATENT DOCUMENTS

BE       1013345 A7    12/2001
CN       201158456 U   12/2008
(Continued)

OTHER PUBLICATIONS

Written Opinion for RU 2015/000401 dated Sep. 21, 2015.

*Primary Examiner* — Brian M O'Hara
*Assistant Examiner* — Keith L Dixon
(74) *Attorney, Agent, or Firm* — Arent Fox LLP; Michael Fainberg

(57) ABSTRACT

The invention relates to a multipurpose airship and, more particularly, to a hybrid dirigible. The airship comprises a body (2) having a parallelepiped shape and docking means (8) comprising four rods connected by a frame and designed to be extractable from the body (2), the ends of these rods being provided each with at least one vacuum cup for adhering to a substantially vertical surface of a building. The docking means (8) are provided with grips adapted to engage with the docking means (8) of another airship of the same design. The invention also relates to a set of airships including at least two said airships. The proposed airship (Continued)

does not require a lot of space for its takeoff and provides fast and secure evacuation of people from tower buildings. In addition, the invention provides the possibility of varying the airship payload directly in flight depending of specific needs.

10 Claims, 2 Drawing Sheets

(58) Field of Classification Search
USPC .......................................................... 244/30
See application file for complete search history.

(56) References Cited

FOREIGN PATENT DOCUMENTS

| | | |
|---|---|---|
| EP | 0460909 A1 | 6/1991 |
| GB | 2225305 A | 5/1990 |
| RU | 2250122 C1 | 4/2005 |
| RU | 2337855 C1 | 11/2008 |
| RU | 2511500 C2 | 4/2014 |
| SU | 681246 A1 | 5/1979 |
| SU | 681246 A1 | 8/1979 |
| WO | 2011/042316 A1 | 4/2011 |

MULTIPURPOSE AIRSHIP AND SET OF AIRSHIPS

CROSS-REFERENCE TO RELATED APPLICATIONS

This application is a National Stage entry of International Application No. PCT/RU2015/000401 filed on Jun. 29, 2015, which claims priority to Finish Patent Application No. 20145641 filed on Jul. 1, 2014. The disclosures of the prior applications are hereby incorporated in their entirety by reference.

The present invention relates to a multipurpose airship using the lifting force of a buoyant gas and more particularly to a hybrid dirigible intended to emergently evacuate people from high-rise buildings and to transport people and cargoes. The invention is also concerned with a set of airships consisting of at least two such airships.

BACKGROUND OF THE INVENTION

Airships using the lifting force of a buoyant gas are well known from the prior art. There are known in particular dirigible crafts of various designs intended for transporting people and cargoes, as well as for carrying out meteorological studies. Besides, various types of dirigibles are widely employed to extinguish fires and to evacuate threatened people from high-rise buildings. In such cases, it is possible to use to this end both soft-envelope dirigibles provided with a nacelle for accommodating people to be evacuated and rigid-hull airships provided with facilities for mooring to the high-rise buildings.

Thus e.g. document RU 2250122 discloses a fire fighting airship comprising a disk-shaped aerostatic body, power plants with a variable thrust vector, a crew cabin with a control system, a landing gear, and a mooring/picketing arrangement. This airship serves to extinguish fires and to localize the flame, in particular when fighting forest fires, range fires and fires occurring in hard-to-reach mountainous regions.

Unfortunately, such airships are not adapted to evacuate people, particularly from high-rise buildings, and, furthermore, they lack suitable arrangements allowing for mooring to the buildings.

Airships used for evacuating people are described e.g. in documents EP 0460909 and BE 1013345 that disclose aerostatic balloons intended to rescue individuals from locations situated well above the ground surface, such as a high-rise building or towers. The balloon may ascend due to filling it with a lighter-than-air gas. While such airships allow people to be evacuated from high-rise buildings, they are not provided with any mooring device, thus rendering difficult the rescuing operations under extreme conditions and in case of severe time constraints. Moreover, such aerostatic balloons suffer from a scarce payload and allow neither evacuating a great number of persons at a time nor transporting oversize cargoes.

Document RU 2337855 discloses a versatile search-and-rescue aircraft usable as a facility for urgently rescuing people, in particular from high-rise buildings. This aircraft comprises a rigid body accommodating hulls with lifting gas, a pilot's cab with airship controls, and a cargo compartment for accommodating cargo and passengers. In the bottom part of the body, there is provided a through longitudinal passage with exit hatches and devices for docking with external objects. In order to rescue persons from premises situated on the upper floors of high-rise buildings, it is necessary to bring the airship into proximity with the window opening, to open the front hatch, to push out the window frame using a telescoping ladder, and finally, to hook the ladder on the window opening. After the airship has been moored, the rescuers and the evacuated people can pass through the ladder into and from the building. The applicant has chosen the airship described in the above-cited document as an analogous technical solution that is closest to the present invention.

While being able to dock with the building walls and having a relatively high payload, such airship suffers at the same time from a number of serious drawbacks. Thus, in particular, this known airship is a heavier-than-air-type aircraft (that is to say, capable of controllably hovering in the air), which requires some space sufficient to its acceleration and take-off. In addition, the above-described design of the docking means is far from being perfect from the standpoint of security to be ensured for the evacuated people. Indeed, in case of evacuating people using the method disclosed in document RU 2337855, the risk is run that the evacuated persons might be injured when pushing out the window frame or panic might arise when people traverse the escape ladder at a significant height over the ground surface. Furthermore, while the payload of the airship under consideration is relatively high with respect to that of the rescue balloons, this payload represents a constant value, no additional means being provided in this airship for increasing it.

It should be also pointed out that in the course of a rescue operation, it may become necessary to resort to supplementary means used traditionally for suppressing fires, or to deliver rescuers, fire-fighters, medical or other personnel to the site of the operation. When using conventional airships, such delivery is only possible by using several airships which are not related with one another in any way. In these circumstances, each of these airships will be the object of a long delicate procedure of mooring to the building where an emergency took place. However, in extreme conditions, and in particular during a fire, the time of carrying out the rescue operation constitutes a critical factor. Besides, in modern megalopolises, the space needed for maneuvering a great number of individual airships between high-rise buildings may be quite restricted. Finally, owing to the lack of possibility of rapidly docking such isolated airships with each other, it is impossible to transfer cargoes and people from one airship to another directly in flight.

Therefore, it is evident from the foregoing that a demand is needed for devising an airship intended for carrying out rescue operations in high-rise buildings, which airship would not require a large space for taking-off and maneuvering and would be capable of ensuring mass evacuation of people from high-rise buildings using a method that is the fastest and the safest for the individuals to be evacuated.

It is a necessity to develop an airship, whose configuration could be varied directly in flight, thus allowing for increasing its payload and for obtaining the possibility of rapidly delivering necessary resources to the rescue place under conditions of restricted space for maneuvering.

SUMMARY OF THE INVENTION

Based on the foregoing, an object of the invention is to provide a multipurpose airship, in particular a dirigible, which would not require a large space for taking-off, would have a high payload and would be provided with reliable means for docking with the surface of high-rise buildings in order to rapidly and safely evacuate people therefrom, as well as to transport persons and cargoes.

An additional object of the invention consists in the provision of a scalable set of airships with the possibility of modifying its configuration by docking the airships with each other directly in flight in order to enhance the payload and to ensure the possibility of rapidly delivering necessary resources to the rescue site.

This object of the invention is achieved by provision of an airship using the lifting force of a buoyant gas, comprising a rigid body, balloons designed to be filled with buoyant gas, controls for controlling the airship, a cargo compartment for accommodating cargo and passenger, engines, and means for docking with external objects, characterized in that said airship is a dirigible with its body having a parallelepiped shape, the cargo compartment being arranged transversely to the body, so that its end faces adjoin the side walls of the body, the docking means being mounted on each of the side walls of the airship around the end face of the cargo compartment and including four rods connected by a frame and implemented to be extractable from the body, the ends of these rods being provided each with at least one vacuum cup for adhering to a substantially vertical surface of the building, the docking means being provided with grips adapted to engage with the docking means of another airship of a same design, the engines ensuring moving the airship both in horizontal and vertical directions.

Therefore, taking into account that the claimed airship is a dirigible craft, it does not require, in contrast to the closest analogous airship, a place for acceleration and taking-off and enjoys the possibility of maneuvering in a very restricted space, thus allowing it to be used for the aim of transporting people and cargoes in conditions where the direct take-off is needed and the flight space is rather limited.

The fact that the dirigible has a parallelepiped shape and the docking means may be directly connected to the building wall makes it possible to form a substantially closed passageway for transferring people from the premises in distress to the rescue airship, thus avoiding any panic and injuries to evacuated people that may occur when pushing out the window frame or when people move on the open rescue ladder. When passing from the disaster-affected premises in the dirigible, the people being evacuated immediately get into the cargo compartment, whose end surface faces the side wall of the body, so that they can move through this compartment, and in particular, pass to another airship (airships), which is docked (sequentially docked) with the first airship serving for them as a "pier".

In addition, thanks to the possibility of docking the airship directly with the building wall, the rescuers can rapidly enter the required area. An evident advantage of such a situation is that when it is necessary to reach the fire area, rescuers and/or firefighters equipped with a heavy outfit do not have to move on stairways of the distressed building, thus losing the time which is always limited in emergency conditions.

After completion of transferring evacuated people into the second airship (airships) docked (sequentially docked) with the first one, assuming the function of a pier, this second airship (airships) may be undocked from the first airship and used to carry out fast evacuation, whereas its place will be occupied by a new airship (airships), thus allowing a substantially uninterrupted evacuation.

It is to be noted that in case where several airships are sequentially docked with the first one which serves as the pier, they could well be undocked and depart together, as a single assembly driven by one pilot.

Since the maximum developed speed of the dirigible is km/h, the fact that its body has a rectangular shape, rather than a more streamlined one, does not prejudicially affect the dirigible's aerodynamics.

The possibility of docking together two or more dirigibles permits varying the airship payload directly in flight and ensuring mass evacuation of people and cargoes. Moreover, the possibility of docking several dirigibles allows rapid delivering of additional resources to the site of rescue operations in conditions of restricted space for maneuvering.

In accordance with an embodiment of the invention, at least two grips of the docking means are secured on the lower portion of the frame of the airship docking means, and at least one grip of the docking means is secured on each lateral portion of the airship frame.

In accordance with an embodiment of the invention, the ends of each rod are provided with at least two vacuum cups, wherein the orientation of the vacuum cups can be changed depending on the curvature of the docking surface.

In accordance with an embodiment of the invention, the airship comprises at least seven engines.

In accordance with an embodiment of the invention, the engines are electric type engines.

In accordance with an embodiment of the invention, the engines are reversible and spark-proof.

In accordance with an embodiment of the invention, the buoyant gas is helium.

In accordance with an embodiment of the invention, the airship is provided with at least two pilot's cabins accommodating the airship controls.

In accordance with an embodiment of the invention, the airship is provided with four pilot's cabins, one pilot's cabin being placed at the each side and end walls.

In accordance with an alternative embodiment of the invention, the airship is provided with at least one portable control console comprising airship controls.

In accordance with a second aspect of the invention, there is provided a set of airships including at least two airships configured according to the first aspect thereof.

Therefore, the airship according to the first aspect of the invention is a self-contained module adapted to be docked with another self-contained module of a similar design. Several modules assembled together constitute a scalable modular system with a payload that may be varied directly in flight depending on a particular situation and on particular needs.

BRIEF DESCRIPTION OF THE DRAWINGS

The invention will now be explained in greater detail with reference to the accompanying drawings, wherein.

DETAILED DESCRIPTION OF THE PREFERRED EMBODIMENTS

Figure 1:
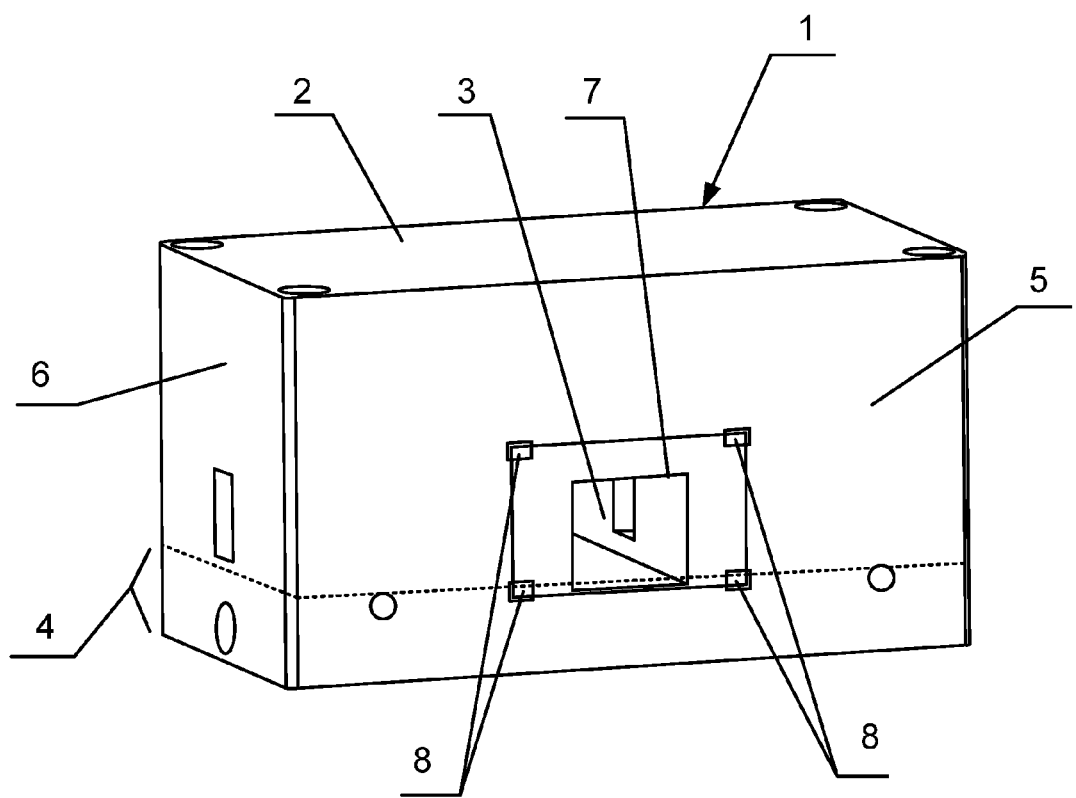
FIG. 1 schematically illustrates a dirigible implemented according to the first aspect of the claimed invention.

FIG. 1 illustrates an embodiment of the airship designed according to the invention.

This airship 1 is a dirigible having a rigid body 2 of a parallelepipedal shape accommodating the airship' controls, such as e.g. pilot's cabin (not shown), a cargo compartment 3, and balloons designed to be filled with buoyant gas, such as helium (not shown). There are also provided containers for storing buoyant gas under pressure that are located on a service deck 4 provided in the lower part of the airship body. In addition, installed on the same deck are compressors serving for pumping buoyant gas into the balloons and sucking it from the balloons in order to regulate the airship payload, as well as other mechanisms and facilities necessary to the operation of the airship.

It is preferable that the airship is provided with spare containers for storing buoyant gas to be mounted on the same service deck 4. The necessity of these spare containers is due to the fact that the pressure of buoyant gas contained in the balloons changes during the use of the dirigible owing e.g. to the gas diffusion through the shells of the balloons, so that it might be necessary to feed the balloons with an additional volume of gas. Furthermore, when maneuvering the airship, it may become necessary to suck some quantity of gas from the balloons.

The airship body has dimensions (width×length×height) of about 8×15×8 m, but these values are not limiting. The body has two side walls 5 extending along the longitudinal axis of the parallelepiped and two end walls 6 extending along the transverse axis thereof.

The body 1 accommodates also engines allowing the airship to move in the directions "up/down", "forth/back", and "right/left". The dirigible is equipped with at least seven engines.

Among said engines, at least one engine, which ensures the airship's up-and-down movements, is located in each of four vertical holes arranged at the corners of the airship's body; at least one engine, which ensures right-and-left movements, is located in each of two transverse holes arranged in the front and rear parts of the service deck; and at least one engine, which ensures forth-and-back movements, is mounted inside a longitudinal hole provided in the middle of the service deck.

Each of the holes contains advantageously two engines that operate jointly.

The engines used are preferably of the electric type, all of them being made reversible and spark-proof.

The airship's controls may be arranged in the pilot's cabin. In this case, the dirigible must be equipped with at least two pilot's cabins, one of which will be adjacent to the end wall 6 of the body 2 and the other cabin to its side wall 5. The pilot's cabins have each a windshield to give a good visibility for the pilot. By arranging the pilot's cabins near the end and side walls, it becomes possible to pilot the airship in different directions, depending upon the current conditions or the configuration of the set of airships.

The airship may be equipped with four pilot's cabins arranged near each of the side walls 5 and end walls 6 of the body.

Alternatively, the airship may be provided with portable control consoles that may be moved as necessary toward one of the side or end walls.

The balloons to be filled with buoyant gas are secured at one end on the upper inner surface of the body 2 and at the other end on the upper surface of the service deck 4, these balloons being provided, at the point of securing to the service deck, with valves for admission and discharge of the buoyant gas.

The cargo compartment 3 is arranged transversely to the body 2 and preferably has, as well, a parallelepiped shape, so that its end faces 7 adjoin the side walls of the body 2. A possibility is provided of opening the end faces 7 of the cargo compartment to form through apertures, as well as that of their closing over the plane of the side wall 5 of the body 2.

The shape of the cargo compartment may be also other than parallelepipedal.

In accordance with the invention, the airship 1 is provided with docking means 8 that include both means allowing the airship to be brought in contact with the building surface and means for connecting it with another dirigible of a same design in order to form a scalable set of airships.

The docking means 8 are preferably made in the form of four rods connected by a frame and implemented to be extractable from the body 2, the ends of these rods being provided each with at least one vacuum cup for adhering to a substantially vertical surface of the building. These docking means 8 are provided with grips adapted to engage with the docking means 8 of another airship of a same design. At least two of these grips of the docking means are secured on the lower portion of the frame of the airship docking means 8, and at least one grip of the docking means 8 is secured on each lateral portion of the frame of the airship docking means.

The number of vacuum cups present on each rod may be different. Thus, each rod may support a single cup or several cups. In case where several cups are mounted on the ends of each rod, their relative orientation will be varied depending on the curvature of the docking surface, i.e. of the building wall. Such a variation of the orientation is carried out automatically under command of an automated system controlling the docking process.

When an emergency or a fire arises in a high-rise building, the dirigible 1 is brought to the required height toward the area of the building from which people or cargoes should be evacuated.

It is to emphasize that under minimal load, the airship under consideration possesses a positive buoyancy. By a minimal load is meant that only the rescue crew and equipment needed to carry out the rescue operation are present aboard the airship. This minimal load may equal about 500 kg. With such positive buoyancy, the airship is capable of reaching the required height, substantially of up to two kilometers, and of moving at this height toward the site of rescue operations.

Figure 2:
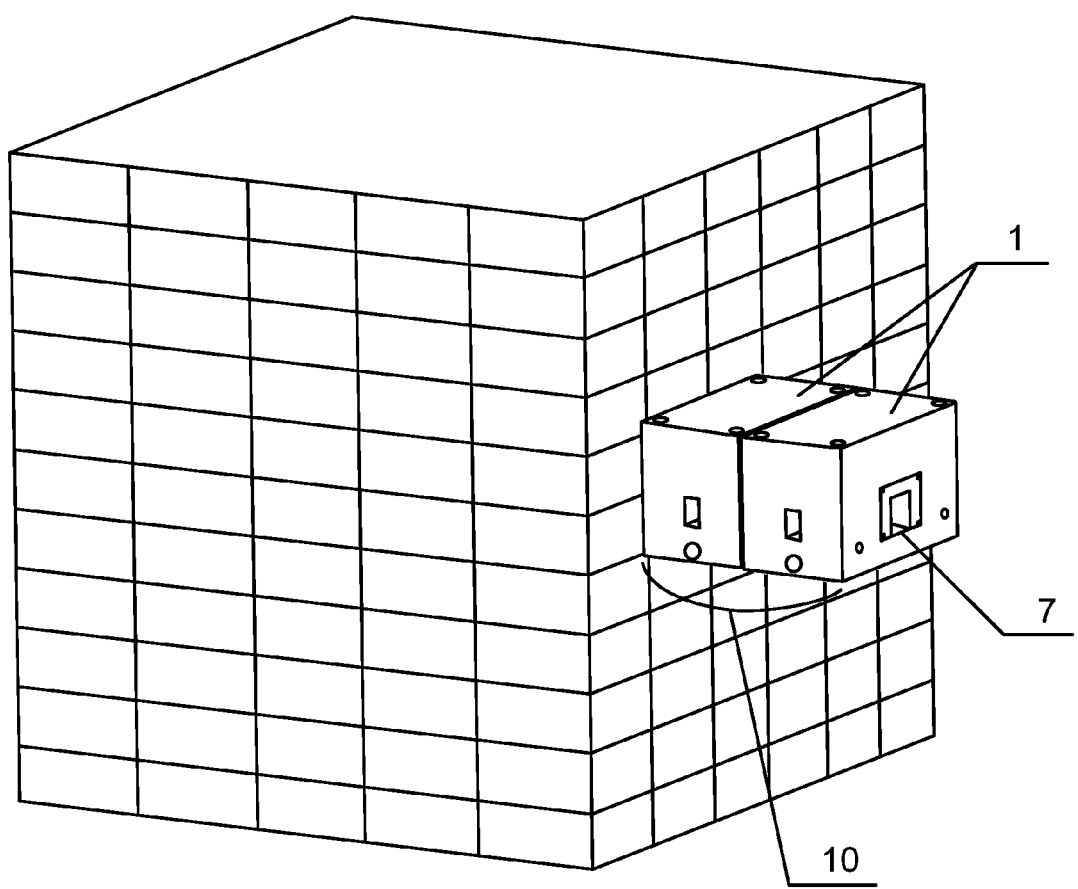
FIG. 2 is a schematic view of a set of modular dirigibles according to the second aspect of the invention, which set is docked to a substantially vertical surface of the high-rise building.

After the airship is positioned in the desired location, the operation proceeds to its docking with the vertical surface of the building. To this end, it is necessary to actuate the first docking means 8 by extracting from the body 2 the rods having vacuum cups on their ends, which cups have to be adhered directly to the surface of the building wall as shown in FIG. 2.

Upon successful completion of docking with the building wall, the rods are re-entered into the airship's body 2, such that the airship, connected by means of the vacuum cups to the building surface, is closely approached thereto.

Thereafter, it is necessary to open the entrance to the cargo compartment on the side wall 5 of the body 2, thus forming a passageway through which people can pass from the distressed building into the dirigible.

When the airship's load is increased owing to the appearance of evacuated persons and/or cargoes, the airship acquires a negative buoyancy. In these conditions, it may be maintained at the required height due to the operation of the engines, which allow it to move up and down. The same engines permit the descent of the loaded airship after it has reached the destination area. This obviates the necessity to ballast the airship for its descent, as well as the requirement for a mooring mast and mooring crew.

In the course of the rescue operation, it may become necessary to have additional means used traditionally when extinguishing fires or to deliver to the rescue area more rescuers, firefighters or medical personnel. Besides, it may become necessary to increase the airship payload during the rescue operation, e.g. to evacuate more people or cargoes from the building.

In these cases, the dirigible object of the invention may be added with another dirigible of a similar design. The connection of an additional airship, that is to say docking between two airships, is carried out using the grips forming part of the docking means 8 that are located on the frame, connecting between them the extractable rods of the docking means 8.

At least two grips of the docking means 8 are secured on the lower portion of the frame of the docking means 8, and at least one grip of the docking means 8 is secured on each lateral portion of the frame of the airship's docking means 8.

When carrying out such docking between two airships, the docking means 8 of both airships are extracted, after which one proceeds to engage the grips of the docking means 8 of the second airship with the frame of the docking means 8 of the first airship. After completion of the engagement, the docking means 8 of each airship are re-entered into the body 2 while leaving a certain minimal distance between two docked dirigibles. Thereafter, the entrances to the cargo-and-passenger compartments 3 on the side walls 5 of the bodies 2 of both airships are opened, thus creating a passageway through which people can pass from one airship into another.

When docked in this way, the two dirigibles constitute a set of airships having a common control system. This set is controlled from the "lead" airship. It is preferable that the control signals coming from the first airship to the second and the next ones are transmitted by means of a cable communication system, whose setup is carried out after completion of docking between two airships. It is also possible to implement a wireless communication between two airships. However, in emergency conditions, e.g. in case of fire, such a communication would be less effective owing to eventual distortions of control signals under high temperatures.

The next airships may be connected to the set obtained in the similar way. Upon completing the evacuation works, one disconnects the set of airships from the building (to this end, it is necessary to undock from the building the first, or "lead", dirigible), after which the entire set 10 may be moved toward the area of destination under the control of the first airship.

The passenger capacity of one airship according to the invention is about twenty to forty people, but it may vary depending on the design features of each particular airship.

The above-described principle of operation of the airship of the invention is also applicable in case where the airship, or a set of airships, is used not for urgently evacuating people but, e.g., for transferring cargoes from high-rise buildings.

While the above-described airship is mainly intended to be used for evacuation purposes, it is also possible to employ it for transporting people and cargoes under normal conditions, as a dirigible of conventional design.

The invention claimed is:

1. An airship using the lifting force of a buoyant gas, comprising a rigid body, balloons designed to be filled with a buoyant gas, controls for controlling the airship, a cargo compartment for accommodating cargo and passengers, engines, and means for docking with external objects, wherein said airship is a hybrid dirigible with its body having a parallelepiped shape, the cargo compartment being arranged transversely to the body, so that its end faces adjoin the side walls of the body, the docking means being mounted on each of the side walls of the airship around the end face of the cargo compartment and including four rods connected by a frame and designed to be extractable from the body, the ends of these rods being provided each with at least one vacuum cup for adhering to a substantially vertical surface of a building, the docking means being provided with grips adapted to engage with the docking means of another airship of the same design, the engines ensuring the possibility of moving the airship both in horizontal and vertical directions.

2. The airship according to claim 1, wherein at least two grips of the docking means are secured on the lower portion of the frame of the airship docking means, and at least one grip of the docking means is secured on each lateral portion of the frame of the airship docking means.

3. The airship according to claim 1, wherein the ends of each rod are provided with at least two vacuum cups, wherein the orientation of the vacuum cups can be changed depending on the curvature of the docking surface.

4. The airship according to claim 1, wherein the airship comprises at least seven engines.

5. The airship according to claim 4, wherein the engines are electric type engines.

6. The airship according to claim 5, wherein the engines are reversible and spark-proof.

7. The airship according to claim 1, wherein the buoyant gas is helium.

8. The airship according to claim 1, wherein the airship includes at least two pilot's cabins accommodating the airship controls.

9. The airship according to claim 8, wherein the airship includes four pilot's cabins, one pilot's cabin being placed at each side and end (6) wall.

10. The airship according to claim 1, wherein the airship includes at least one portable control console comprising the airship controls.

\* \* \* \* \*